United States Patent [19]

Kim

[11] Patent Number: 5,724,329
[45] Date of Patent: Mar. 3, 1998

[54] APPARATUS FOR CONTROLLING ROTATIONAL SERVO BY USING FREQUENCY PULSE SIGNAL GENERATOR

[75] Inventor: Young-Han Kim, Suwon, Rep. of Korea

[73] Assignee: Samsung Electronics Co., Ltd., Kyungki-do, Rep. of Korea

[21] Appl. No.: 685,916

[22] Filed: Jul. 22, 1996

[30] Foreign Application Priority Data

Aug. 22, 1995 [KR] Rep. of Korea ................ 95-25972

[51] Int. Cl.$^6$ .................................................. G11B 7/00
[52] U.S. Cl. ........................... 369/50; 369/47; 369/59
[58] Field of Search ............................ 369/30, 47, 48, 369/49, 54, 58, 59, 32

[56] References Cited

U.S. PATENT DOCUMENTS 5,111,305   5/1992   Yamashita ...................... 369/50 X

*Primary Examiner*—Muhammad N. Edun
*Attorney, Agent, or Firm*—Sughrue, Mion, Zinn, Macpeak & Seas, PLLC

[57] ABSTRACT

An apparatus for controlling a rotational servo by using a frequency pulse signal generator is provided. The rotational servo controlling apparatus has a frequency pulse signal generator for generating a frequency pulse signal indicating the current rotational speed of the motor. A track count signal generator counts the number of tracks from the current track to an object track, and generates a corresponding track count signal. A microprocessor receives the frequency pulse and the track count signals and issues a command to generate a reference frequency pulse signal. A reference pulse signal generator receives the command and generates the reference frequency pulse signal. A phase comparator compares the frequency pulse signal and the reference frequency pulse signal and issues a comparison signal. The rotational servo controls the rotational speed of the spindle motor to rotate at a speed proper for the reading of data from the object track, i.e., so that the frequency pulse signal is identical to the reference frequency pulse signal. Therefore, a stable and rapid rough search can be performed.

3 Claims, 2 Drawing Sheets

APPARATUS FOR CONTROLLING ROTATIONAL SERVO BY USING FREQUENCY PULSE SIGNAL GENERATOR

BACKGROUND OF THE INVENTION

The present invention relates to an apparatus for controlling a rotational servo for a track search on an optical disk, and more particularly, to an apparatus for controlling a rotational servo in a high speed object track search of an optical disk by using frequency pulses generated from a frequency pulse signal generator.

In general, a search for determining the position of an object track on which an optical pickup is placed requires the optical pickup to be moved over the intervening tracks and be placed accurately over the object track.

The width of a pit on an optical disk is usually extremely small, i.e. approximately 0.4 μm. When a light spot of an optical pick up is offset from an object track by 0.2 μm or more, a normal reproduction signal cannot be obtained. In practice, the positioning of an optical pick-up must be highly accurate having an error of less than 0.1 μm of the target. However, when a track on an optical disk deviates from a target position by 200–300 μm, it is very difficult for a single control device to perform a highly accurate search. Therefore, the search is conventionally performed by a two-stage mechanism employing a coarse adjustment motor system for a rough search and a fine adjustment motor system for a fine search.

A track counter is generally used for rapidly performing a rough search of a laser disk player. In order to search an object track at a high speed in a laser disk player which is controlled by a constant linear speed mode, a rotational servo must operate at a high speed to control the rotational speed of the spindle motor. That is, the servo must adjust the speed of the motor in order to provide the proper linear speed required to read data from the tracks over which the head is placed.

FIG. 1 is a block diagram schematically showing a conventional rotational servo controlling apparatus. The rotational servo controlling apparatus shown is comprised of an optical pickup 10, a loading motor 11 for moving the optical pick-up 10 through a slider, a track count signal generator 12 for counting the number of tracks covered in the radial direction of an optical disk by the optical pick-up 10 and generating a track count (T.C.) signal indicative of the count value, a synchronization signal detecting and controlling unit 14 for detecting a synchronization signal from an analog signal read by the optical pick-up 10 and controlling the synchronization signal, a rotational servo 16 for controlling the rotational speed of a spindle motor, and a microprocessor 18 for receiving the track count signal from the track count signal generator 12 and controlling a servo circuit according to the position of a track to thereby control the rotation of the spindle motor.

In the rotational servo controlling apparatus shown in FIG. 1, the optical pick-up 10 is moved by the slider attached to the loading motor 11 and the number of tracks which the optical pick-up 10 travels across is counted, with a tracking loop opened. Given an object track, the microprocessor 18 controls the rotational servo 16 by moving the slider to the object track and synchronizing the phase of the rotational servo 16 near the object track. Thus, the rotational speed of the spindle motor is controlled for a rough search.

Nonetheless, the prior art exhibits distinct drawbacks in that it takes too much time to synchronize the phase of the rotational servo near the object track for controlling the speed of the spindle motor, and that it is difficult to control the spindle motor.

SUMMARY OF THE INVENTION

The present invention is intended to overcome the above problems. The object of the present invention is to provide an apparatus for controlling the rotational servo, which controls the speed of a spindle motor to perform a rapid rough search, on the basis of a frequency pulse signal for each track corresponding to the rotational speed thereof and a track count signal generated from a track count generator, indicative of the number of tracks between a current track and an object track.

To achieve the above object, there is provided a rotational servo controlling apparatus for controlling the speed of the spindle motor, comprising: a frequency pulse signal generator for generating a frequency pulse signal indicating the current rotational speed of the motor; a track count signal generator for counting the number of tracks from the current track to the object track and generating a track count signal indicative of the count value; a microprocessor for issuing a command to generate a reference frequency pulse signal for the object track, on the basis of the frequency pulse signal received from the frequency pulse signal generator and the track count signal received from the track count signal generator; a reference frequency pulse signal generator for generating the reference frequency pulse signal in response to the command of the microprocessor; a phase comparator for comparing the frequency pulse signal for the current track received from the frequency pulse signal generator and the reference frequency pulse signal for the object track received from the reference frequency pulse signal generator; and a rotational servo for controlling the rotational speed of a spindle motor to rotate at a speed proper for the reading of data from the object track, i.e., so that the frequency pulse signal is identical to the reference frequency pulse signal. Therefore, a stable and rapid rough search can be performed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

A preferred embodiment of the present invention will be described in detail referring to FIG. 2.

Figure 1:
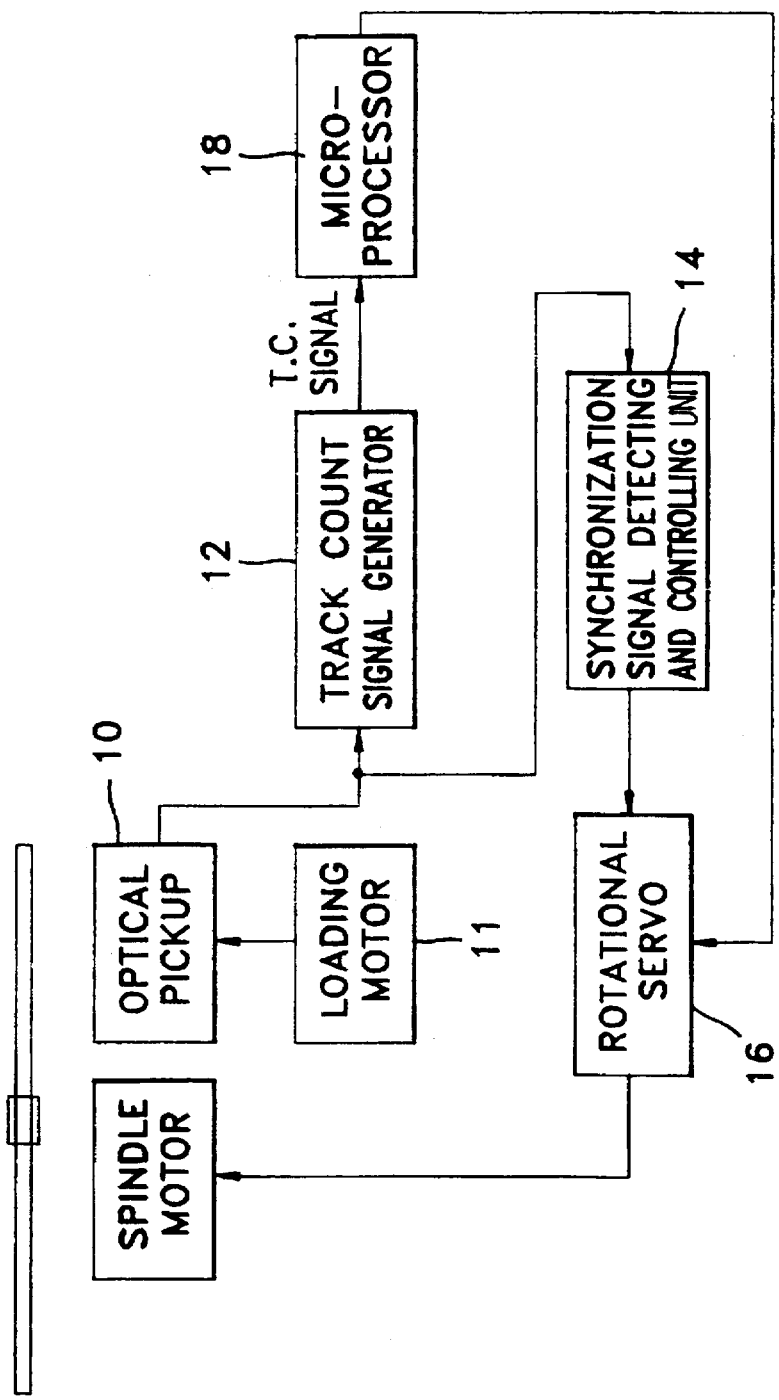
FIG. 1 is a block diagram schematically showing a conventional rotational servo controlling apparatus.
Figure 2:
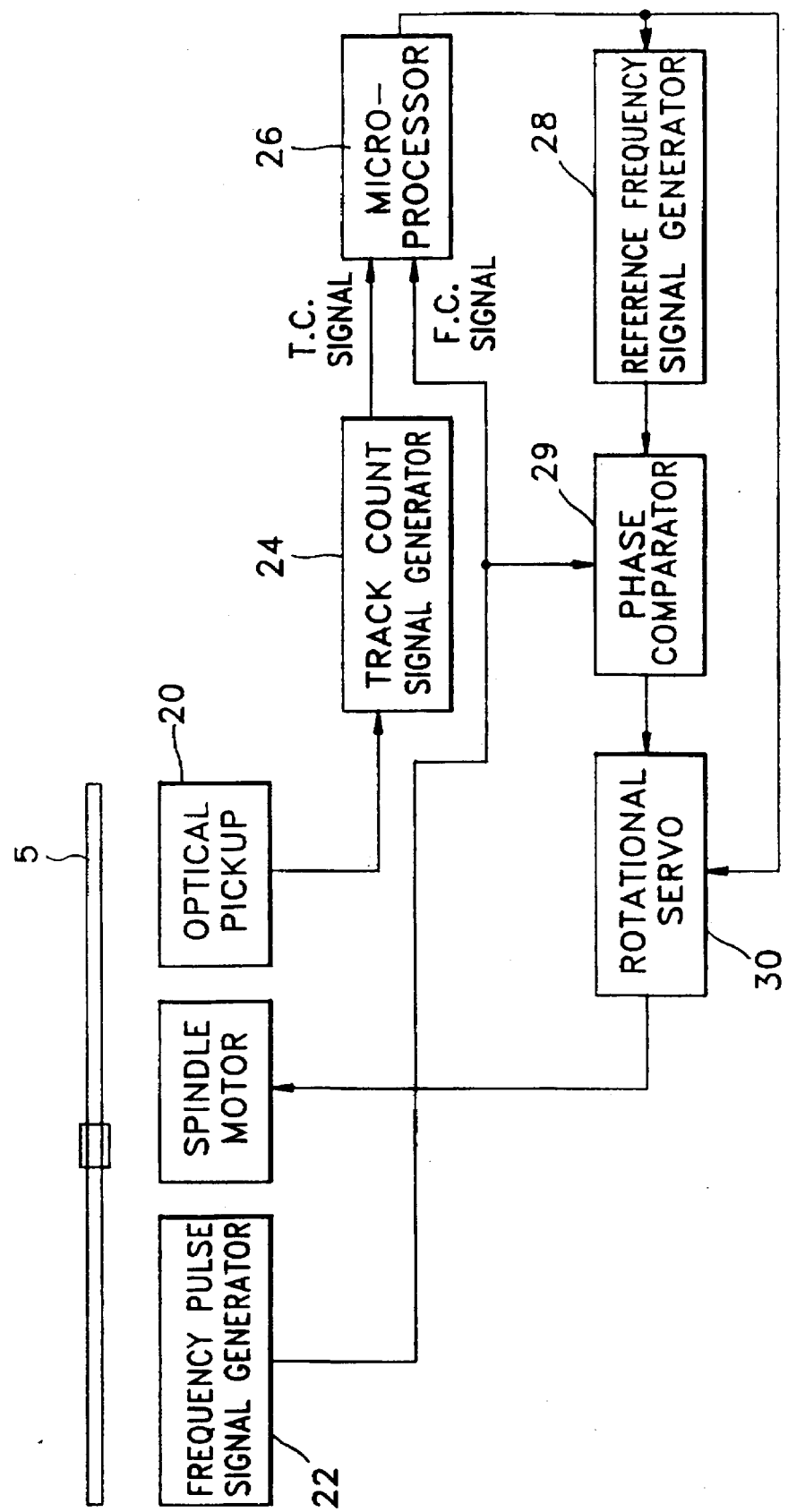
FIG. 2 is a block diagram schematically showing a rotational servo controlling apparatus according to a preferred embodiment of the present invention.

The rotational servo controlling apparatus shown in FIG. 2 includes a frequency pulse signal generator (FG) 22 for generating a frequency pulse (F.G.) signal per second for the current track of the laser disk 5. That is, the FG detects the rotational frequency of the spindle motor and generates a signal indicative thereof. This can be done using techniques known to those skilled in the relevant art, where the rotational speed of the laser disk is determined indirectly by monitoring the rotational speed of the motor. For example, an optical technique can be employed, wherein reflection pits of equal size are arranged at constant intervals on the side surface of the spindle motor. The FG emits a light beam which is reflected by the pits on the spindle motor. A light detector on the FG then detects the reflecting light and a frequency signal is generated corresponding to the frequency of the reflected light.

Also shown in FIG. 2 is a track count signal generator 24 for counting the number of tracks from the current track to an object track and generating a track count signal indicative of the count value. The microprocessor 26 receives the frequency pulse signal FG and the track count signal. It then issues a command to generate a reference frequency pulse signal for the object track, on the basis of the frequency pulse signal output from the frequency pulse signal generator 22 and the track count signal output from the track count signal generator 24. The reference frequency pulse signal corresponds to the speed the spindle motor needs to be rotated for reading data from the desired track.

The reference frequency pulse signal generator 28 generates the reference frequency pulse signal for the object track in response to the command of the microprocessor 26, and a phase comparator 29 compares the frequency pulse signal for the current track output from the frequency pulse signal generator 22 and the reference frequency pulse signal for the object track output from the reference frequency pulse signal generator 28. The rotational servo 30 controls the speed of a spindle motor to rotate at a speed proper for the reading of data from the object track. This can be done by controlling the speed of the rotational servo so that the frequency pulse signal is identical to the reference frequency pulse signal. To that effect, the speed can be controlled in a manner to make the comparison signal approach zero. Similarly, depending on the actual implementation of the system, the speed can be controlled so that the comparison signal approaches a value which is other than zero, but is indicative of the fact that the frequency pulse signal is identical to the reference frequency pulse signal.

In the above rotational servo controlling apparatus, the microprocessor 26 issues a command to generate a reference frequency pulse signal for an object track on the basis of a frequency pulse signal for a current track received from the frequency pulse signal generator 22 and a track count signal indicative of the number of tracks between the current track and the object track received from the track count signal generator 24. The reference frequency pulse signal generator 28 generates the reference frequency pulse signal for the object track in response to the command of the microprocessor 26.

For example, assuming that 24 reflection pits are provided on the circumference of the spindle motor. Then, 24 frequency pulses are generated for one rotation (frame). Assuming further that during constant linear velocity control the disk is rotated at 1800 rpm when reading the innermost track, and at 600 rpm when reading the outermost track, the frequency of the pulses would be tripled when going from the outermost to the innermost tracks.

In the above example, 720 pulses per second are generated when the spindle motor rotates at speed suitable for reading the track on the innermost circumference (24 pulses per second×30 frames=24 pulses/revolution×1800 rev./min.×1 min./60 sec.). When the spindle motor rotates at speed suitable for reading the track on the outermost circumference, 240 pulses per second are generated (24 pulses per second×10 frames=24 pulses/rev.×600 rev./min.×1 min./60 sec.). These frequency pulses are input to the microprocessor 26. That is, the number of frequency pulses per second input to the microprocessor during rotation corresponding to the innermost circumference is three times that of the number of pulses input during rotation corresponding to the outermost circumference. Thus, the frequency pulses allow for accurate monitoring of the rotational speed of the motor, especially during track search.

The microprocessor 26 stores the number of the frequency pulse signals corresponding to each track. Thus, depending on the desired track, the microprocessor can determine the proper frequency of the pulse signal. Therefore, when the frequency pulse received is different from the proper frequency (i.e., the desired track is not the current track), the microprocessor generates a correction signal instructing the reference frequency pulse signal generator 28 to generate a reference pulse signal.

The phase comparator 29 compares the frequency pulse signal for the current track and the reference frequency pulse signal for the object track received from the reference frequency pulse signal generator 28, and outputs the comparison result. The rotational servo 30 controls the speed of the spindle motor so that the comparison result received from the phase comparator 29 is identical to the reference frequency pulse signal.

As described above, in the rotational servo controlling apparatus according to the present invention, a reference frequency pulse signal is generated on the basis of a frequency pulse signal for a current track generated from the frequency pulse signal generator and a track count signal generated from the track count signal generator, and the rotational servo is controlled according to the reference frequency pulse signal, thereby controlling the rotational speed of the spindle motor. Consequently, a stable and rapid rough search can be performed.

Although the invention has been described and shown in terms of a preferred embodiment thereof, it will be understood by those skilled in the art that changes in form and detail may be made therein without departing from the spirit and scope of the invention as defined in the appended claims.

What is claimed is:

1. A rotational servo controlling apparatus for controlling the rotational speed of a spindle motor comprising:

a frequency pulse signal generator for generating a frequency pulse signal indicating the current rotational speed of the spindle motor;

a track count signal generator for counting the number of tracks from the current track to an object track, and generating a corresponding track count signal;

a microprocessor receiving said frequency pulse signal and said track count signal and issuing a command to generate a reference frequency pulse signal for said object track;

a reference pulse signal generator for generating said reference frequency pulse signal in response to the command of said microprocessor;

a phase comparator for comparing said frequency pulse signal received from said frequency pulse signal generator and said reference frequency pulse signal for the object track received from said reference frequency pulse signal generator and output a comparison signal; and a rotational servo receiving the comparison signal and controlling the rotational speed of the spindle motor to rotate at speed proper for the reading of data from the object track.

2. The rotational servo controlling apparatus according to claim 1, wherein said rotational servo controls the rotational speed of the spindle motor so that said comparison value reaches zero.

3. The rotational servo controlling apparatus according to claim 1, wherein said rotational servo controls the rotational speed of the spindle motor so that said frequency pulse signal received from said frequency pulse signal generator is equal to said reference frequency pulse signal for the object track received from said reference frequency pulse signal generator.

* * * * *